United States Patent [19]

Zardi et al.

[11] Patent Number: 5,254,316
[45] Date of Patent: Oct. 19, 1993

[54] REACTORS FOR HETEROGENEOUS SYNTHESIS

[75] Inventors: Umberto Zardi, Via Lucino 57, CH-6932 Breganzona; Giorgio Pagani, Lugano, both of Switzerland

[73] Assignees: Ammonia Casale S.A., Italy; Umberto Zardi, Breganzona, Switzerland

[21] Appl. No.: 864,178

[22] Filed: Apr. 3, 1992

Related U.S. Application Data

[63] Continuation of Ser. No. 453,709, Dec. 20, 1989, abandoned.

[30] Foreign Application Priority Data

Dec. 21, 1988 [CH] Switzerland .................. 04739/88

[51] Int. Cl.⁵ .............................. B01J 8/04; C01C 1/04
[52] U.S. Cl. .................................... 422/148; 422/191; 422/192; 422/194; 422/195; 422/198; 423/360

[58] Field of Search ............... 422/148, 191, 194, 198, 422/195, 192; 423/360

[56] References Cited

U.S. PATENT DOCUMENTS

| | | | |
|---|---|---|---|
| 4,946,657 | 8/1990 | Zardi | 422/148 |
| 4,963,338 | 10/1990 | Zardi et al. | 423/360 |

*Primary Examiner*—Jill A. Johnston
*Attorney, Agent, or Firm*—Ostrolenk, Faber, Gerb & Soffen

[57] ABSTRACT

Improved process to convert in situ conventional reactors with four catalytic beds with axial flow and with intermediate quenching (Kellogg reactor), Third and fourth original beds are combined thus obtaining a reactor with three beds through which the synthesis gas now flows with a substantially radial flow.

5 Claims, 2 Drawing Sheets

REACTORS FOR HETEROGENEOUS SYNTHESIS

This is a continuation of application Ser. No. 07/453,709, filed on Dec. 20, 19898, now abandoned.

BACKGROUND OF THE INVENTION

1. Field of the Invention

The invention relates to a process to improve yields and reduce energy consumption in existing reactors for heterogeneous synthesis, and more particularly for the synthesis of ammonia, consisting of several catalytic beds through which synthesis gas flows axially, and cooled by feeding quench gas between beds.

2. Description of the Related Art

The invention also includes reactors so obtained.

It is known that one of the most common reactors currently used in ammonia synthesis plants is the type with four catalytic beds through which the synthesis gas flows axially, with intermediate quenching (Kellogg).

Numerous systems have been put forward, described and adopted in order to improve yields in the above-mentioned Kellogg reactors. More particularly, according to a description in "Nitrogen", Nr. 165, Jan./Feb. 1987, Topsoe Converted the Kellogg 4-bed reactor into a 2-bed reactor (by joining the 1st and 2nd bed and the 2nd and 3rd bed of the original reactor), with intermediate cooling between beds by means of a heat exchanger (FIG. 1 in the article quoted). The gas flows radially.

According to the same article, Kellogg themselves converted the reactor using the space in the 1st bed, introducing heat exchangers. The second bed in the existing reactor becomes therefore the 1st bed in the new layout according to which the 3rd and 4th bed in the existing reactor are intended to operate in parallel (according to the so-called split-flow system), and a reactor is therefore obtained in which there are two reaction stages with intermediate cooling by exchanger (FIG. 8 of the above-mentioned article). The gas flow remains axial as in the original reactor. Still in the above-mentioned article in "Nitrogen", it is stated that the applicants intend to maintain the same number of beds as in the original Kellogg reactor (4 beds) and the same quenching system between beds.

The gas flow is changed from axial to axial-radial (FIG. 4 in the article).

Ammonia Casale has been the first to describe a system for the conversion in situ of Kellogg reactors thus improving performance and reducing consumption. In effect in its U.S. Pat. No. 4,755,362 the Applicants show in FIG. 1A, as state of the Art, exactly the above classic Kellogg reactor with four axial beds and four intermediate quenches.

In this pioneering U.S. Pat. No. 4,755,362 the Applicants have maintained the same number of beds as at the start even in substantially radial reactors obtained by conversion in situ.

In Swiss Patent Application No. 02529/87-9 (corresponding to U.S. Pat. No. 4,963,338) the Applicants have suggested (FIG. 1) a further application of their system for modernizing a 4-bed Kellogg reactor converting it into a 3-bed reactor with quenching between the 1st and 2nd beds and cooling by means of an exchanger between the 2nd and 3rd beds. As the above-mentioned Figure shows, the 2nd bed in this layout is obtained by joining the 2nd and 3rd bed in the original reactor into a new 3-bed layout with quenching between the first and the second bed and an exchanger between the 2nd and 3rd bed. As FIG. 1 in said Swiss Patent Application shows, such Figure still being shown in this Patent Application, the 2nd and the 3rd bed were made into one with the interchanger being installed coaxially.

This solution, although offering considerable advantages when compared to the quench system, can however give rise to a less than optimal distribution of the catalyst, in the sense that the volume of catalyst installed in the second bed could result excessive.

Summary of the Invention

The purpose of this invention is to supply a process and a new layout for the modified reactor which avoid the above disadvantages.

Continuing in their research the Applicants have now found surprisingly that considerable improvements can be obtained by adopting the layout described in FIG. 1 of Swiss Patent Application No. 02529/87-9, but more especially by creating the three beds by joining the 3rd and 4th bed in the original Kellogg 4-bed reactor layout.

The gas flow is generally changed from the original axial flow into a radial or axial-radial flow in at least part of the beds.

More particularly, and as described in the above-mentioned previous Swiss Patent Application, the axial flow could be maintained in the 1st bed.

BRIEF DESCRIPTION OF THE DRAWINGS

Other features and advantages of the present invention will become apparent when the following description is read in conjunction with the accompanying drawings, in which.

DETAILED DESCRIPTION OF THE PREFERRED EMBODIMENT

Figure 2:
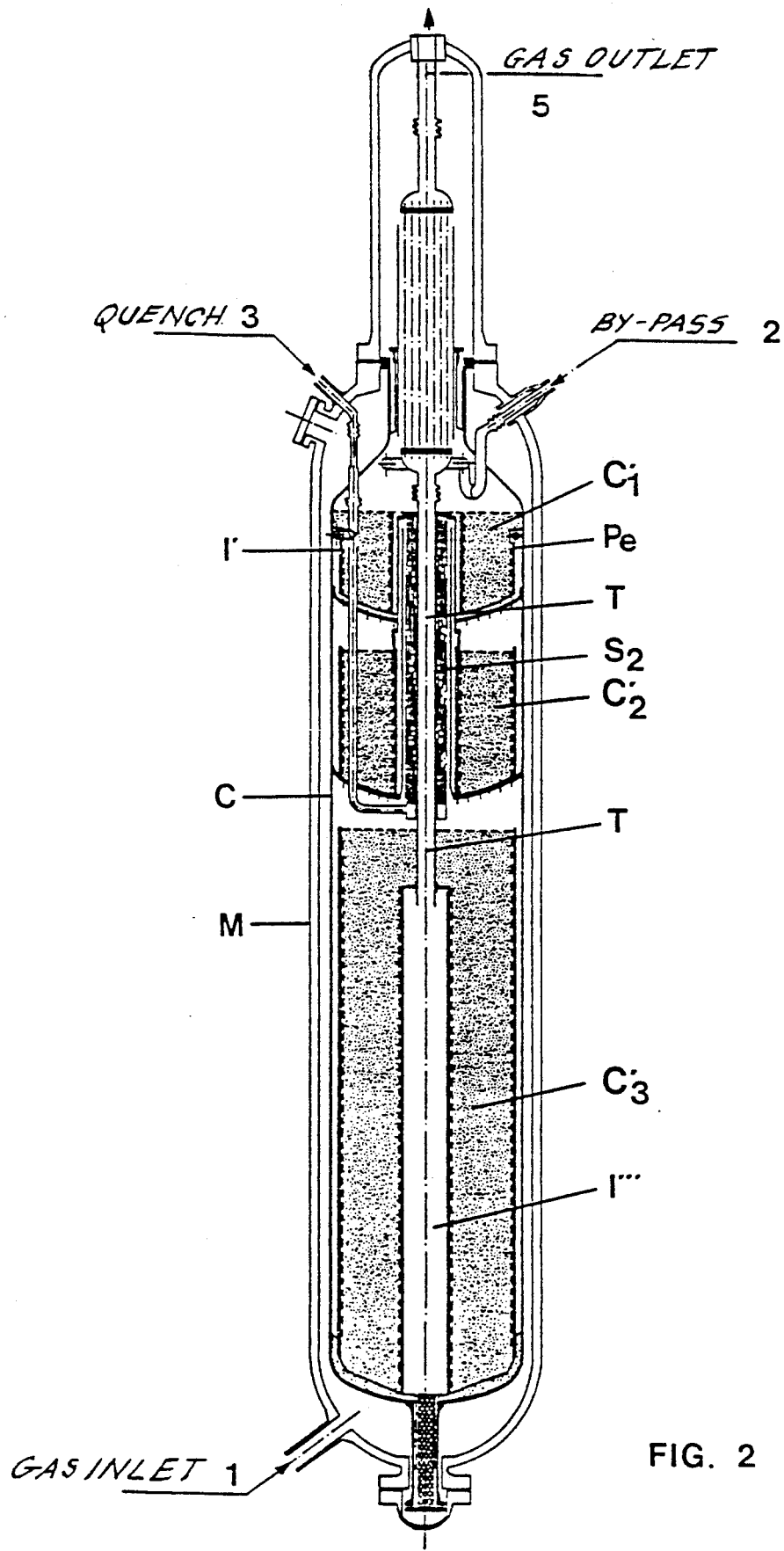
FIG. 2 shows a longitudinal, cross sectional view of a reactor in accordance with the invention.

The various aspects and advantages of the invention will become more apparent from the description of the embodiment shown in FIG. 2.

FIG. 2 shows schematically a synthesis reactor. Feed gas stream 1 enters from the bottom of reactor shell M and flows to the top of the reactor through an airspace between shell M and cartridge C. Bypass feed stream 2 feeds gas to a region above first catalyst bed $C_1'$. Fresh quench gas 3 is introduced into reactor shell M and a hot gas stream 5 exits reactor shell M. An airspace I is located between cartridge C and outside wall Pe of first catalyst bed $C_1'$. A tube and shell heat exchanger $S_2$ extends through both first catalyst bed $C_1'$ and second catalyst bed $C_2'$. A central collector I''' is located within third catalyst bed $C_3'$ and a central tube T extends through first catalyst bed $C_1'$ and second catalyst bed $C_2'$.

Figure 1:
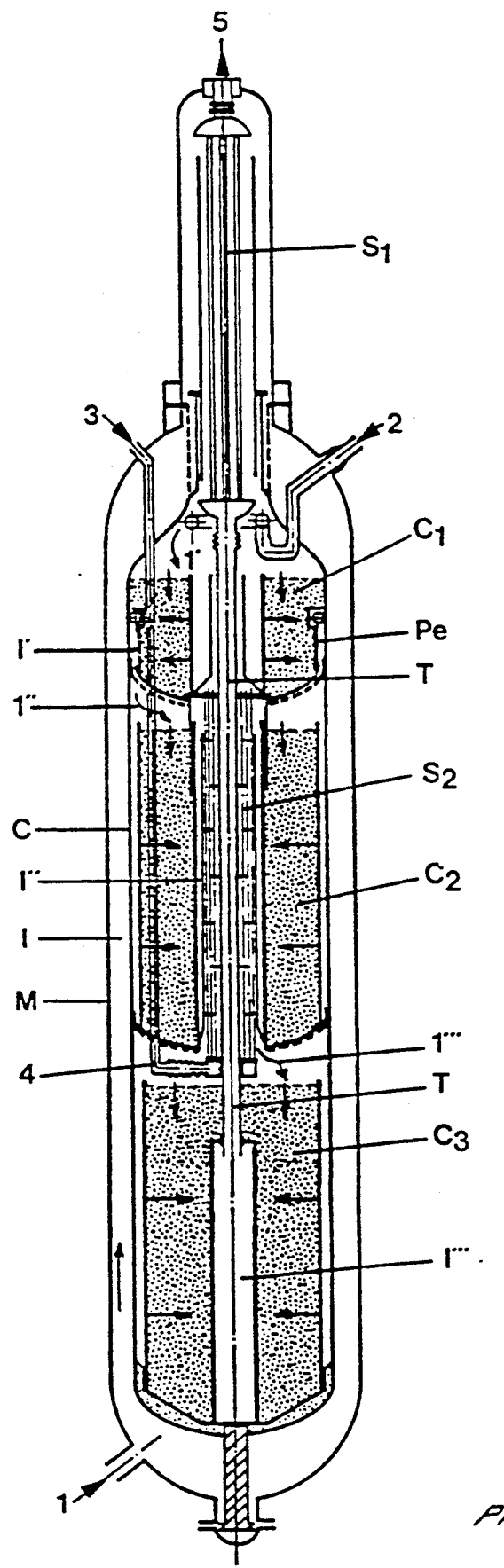
FIG. 1 shows a longitudinal, cross-sectional view of a prior art reactor.

Characteristically it can now be seen (FIG. 2) that of the three beds C1, C2 and C3, the last one is obtained by combining together the 3rd and 4th bed, i.e. the last but one and the last bed in the original layout of the Kellogg axial reactor (shown by way of example in FIG. 1A of U.S. Pat. No. 4,755,362). In this new embodiment the layout is still the "3 beds, 1 quenching, 1 interchanger" arrangement, but with the following important differences:

the interchanger, still in a central position, is inserted coaxially with the 1st and 2nd bed and is fed, shell-side, by the partly reacted gas leaving the 2nd bed and tube-side by the fresh gas;

the dimensions of the 1st and 2nd bed may remain the same as the original ones, while the original 3rd and 4th bed are combined together.

In this way the volume of catalyst will be greatest in the new third lower bed, and smallest in the first bed; this distribution results, not unsurprisingly, in a considerable improvement in reactor performance. In addition, it is conveniently carried out in situ.

Although the present invention has been described in connection with a preferred embodiment thereof, many other variations and modifications will now become apparent to those skilled in the art without departing from the scope of the invention. It is preferred therefore, that the present invention not be limited by the specific disclosure herein, but only by the appended claims.

We claim:

1. A process for converting in situ an existing ammonia synthesis reactor comprising two upper catalyst beds and two lower catalyst beds into a more efficient ammonia synthesis reactor, the two upper catalyst beds being contained within substantially annular shaped catalyst baskets, each basket having a substantially centrally located opening, the existing ammonia synthesis reactor comprising a four catalyst bed, quench-type, ammonia synthesis reactor, the process comprising the steps of:

introducing into the reactor means for directing gas flow radially or axially-radially in each of the two upper catalyst beds;

combining the two lower catalyst beds into a single bed having a size substantially similar to the cumulative size of the two lower beds, and including in the combined single bed means for directing gas flow radially or axially-radially therein; and introducing a heat exchanger including means for indirect cooling into the reactor for cooling gas flowing between the two upper catalyst beds and the combined single bed and locating the heat exchanger in the substantially centrally located opening at a position extending substantially coextensive within both of the two upper beds.

2. The process of claim 1, further comprising the steps of introducing into the reactor means for adding quench gas into the reactor and locating the quench gas introducing means between the two upper catalyst beds.

3. A converted ammonia reactor comprising:

two upper catalyst beds contained within two substantially annular shaped catalyst baskets, each catalyst basket having a substantially centrally located opening;

a lower catalyst bed contained in a third catalyst basket, the lower catalyst bed substantially filling the lower half of the ammonia reactor:

means for directing gas flow radially or axially-radially in the two upper catalyst beds and the lower catalyst bed; and a heat exchanger including means for indirect cooling for cooling gas flowing between the two upper catalyst beds and the lower catalyst bed, the heat exchanger being located in the substantially centrally located opening and extending substantially coextensive with both of the catalyst baskets containing the two upper catalyst beds.

4. The reactor of claim 3 wherein the third catalyst basket is substantially annularly shaped.

5. The reactor of claim 3 wherein the third catalyst basket includes a substantially centrally located opening.

* * * * *